April 26, 1960 J. MITZL 2,934,297
COIL SPRING ASSEMBLY FOR SUPPORTING A MOTOR
Filed April 13, 1954 3 Sheets-Sheet 1

Joseph Mitzl
INVENTOR.

BY
Attorneys

Joseph Mitzl
INVENTOR.

April 26, 1960    J. MITZL    2,934,297
COIL SPRING ASSEMBLY FOR SUPPORTING A MOTOR
Filed April 13, 1954    3 Sheets-Sheet 3

Joseph Mitzl
INVENTOR.

BY
Attorneys ced Apr. 26, 1960

2,934,297

COIL SPRING ASSEMBLY FOR SUPPORTING A MOTOR

Joseph Mitzl, Melvindale, Mich., assignor of one-half to John Mitzl, Highland Park, Mich.

Application April 13, 1954, Serial No. 422,765

6 Claims. (Cl. 248—26)

This invention relates in general to improvements in supports and more specifically to improved motor supports.

When electric motors and the like are mounted on supporting surfaces, the vibration of the rotating parts of the motors are imparted to the supporting surfaces unless the motors are cushioned relative to the supporting surfaces. Accordingly, electric motors and the like have and are being resiliently mounted with rubber or rubber-products being utilized for cushioning purposes. However, rubber and like products deteriorate rapidly and harden. Thus, after a rubber support has a few years of life, it becomes ineffective and must be replaced.

It is therefore the primary object of this invention to provide a resilient mount or support for motors and the like, the resilient support utilizing primarily coil springs which have lasting qualities and are in on way affected by age.

Attempts have been made in the past to utilize coil springs in motor supports and my Patent No. 1,845,551 dated February 16, 1932, of which this application is an improvement, is illustrative of prior attempts. However, as is clearly shown by my patent the cost of mounting coil springs is normally such that it is prohibited. Therefore, to date there has been little replacement of rubber motor mounts by coil springs.

It is therefore another object of this invention to provide an improved motor support which will incorporate a coil spring in such a manner that the mounting of the coil spring is extremely simple so that the production of the motor support utilizing a coil spring is economically feasible.

A further object of this invention is to provide an improved motor support which utilizes a coil spring, the coil spring being so mounted whereby the full resiliency thereof is utilized and at the same time the mounting thereof is extremely simple.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
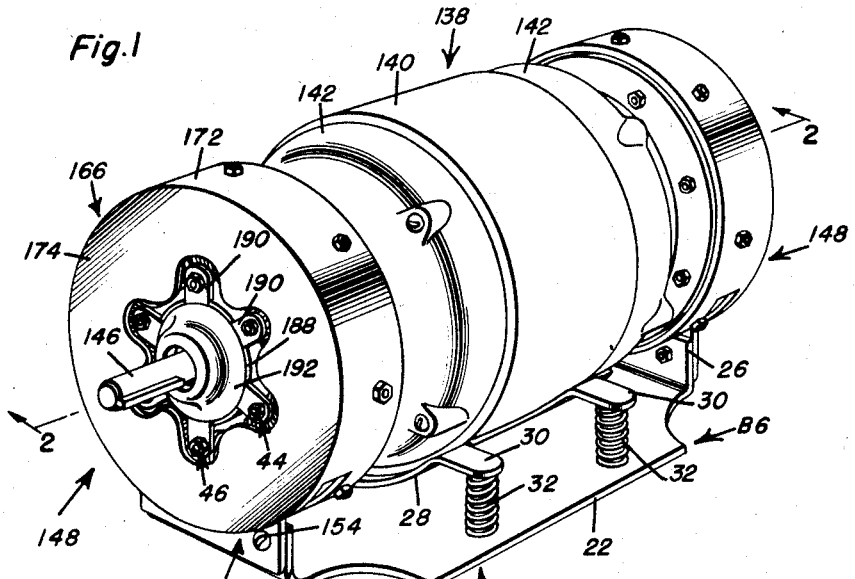
Figure 1 is a perspective view of an electric motor and shows the same mounted in the motor support.
Figure 2:
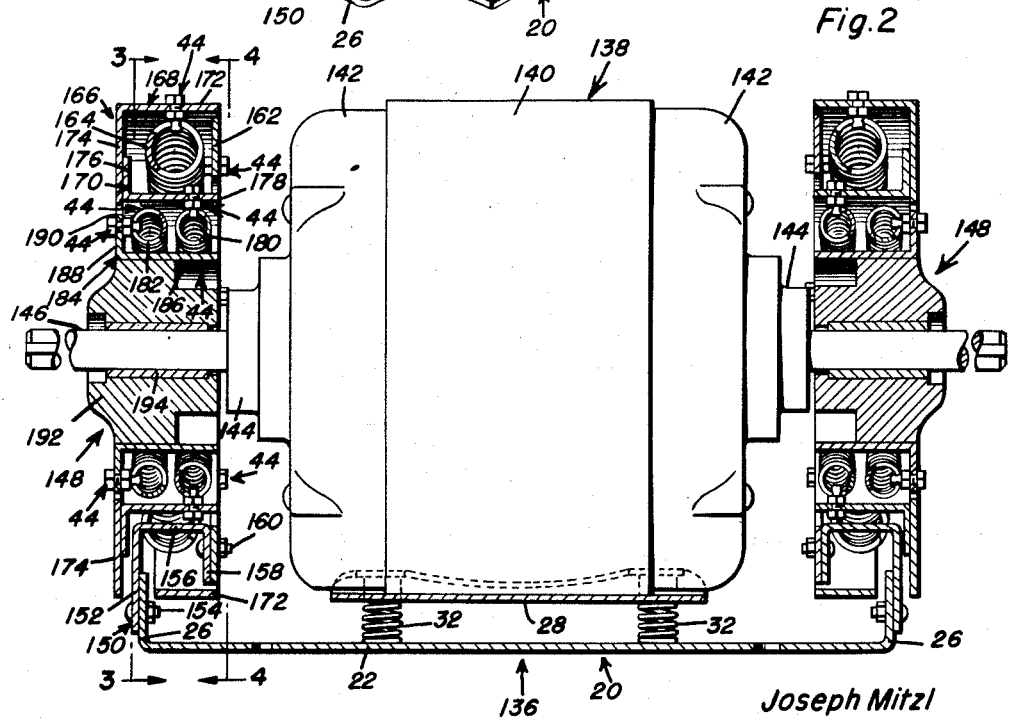
Figure 2 is a longitudinal vertical sectional view on a larger scale taken substantially upon the plane indicated by the section line 2—2 of Figure 1 and shows the specific construction of mounting ring assemblies of the motor support of Figure 1 and the relationship thereof with respect to the electric motor.
Figure 3:
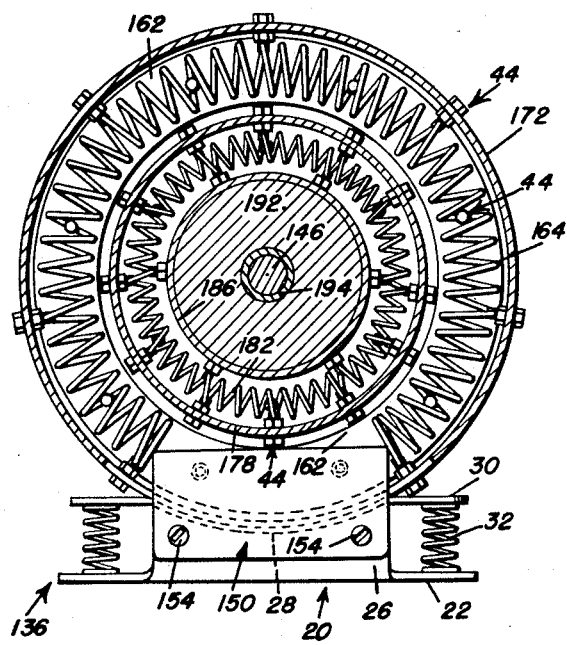
Figure 3 is an enlarged transverse vertical sectional view taken substantially upon the plane indicated by the section line 3—3 of Figure 2 and shows the general relationship of coil springs which form resilient mounting means with respect to supporting rings of the supporting ring assembly.
Figure 4:
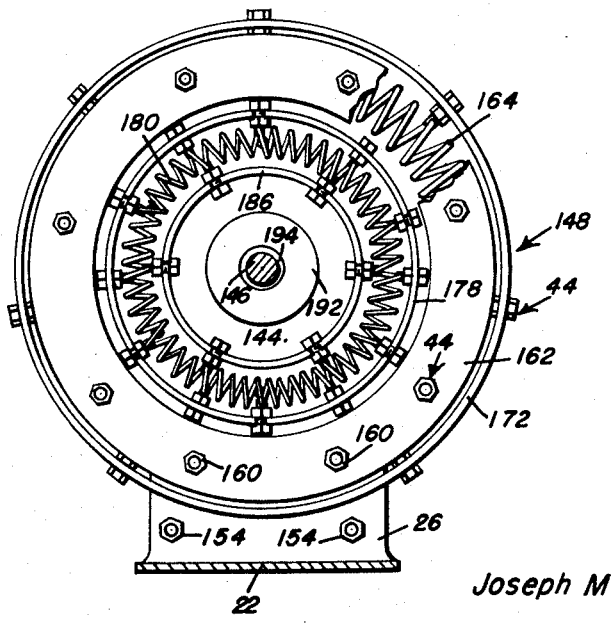
Figure 5:
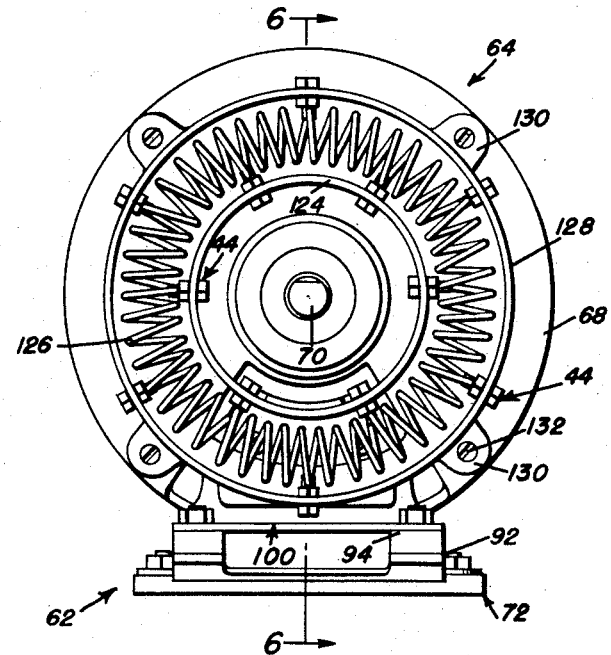
Figure 6:
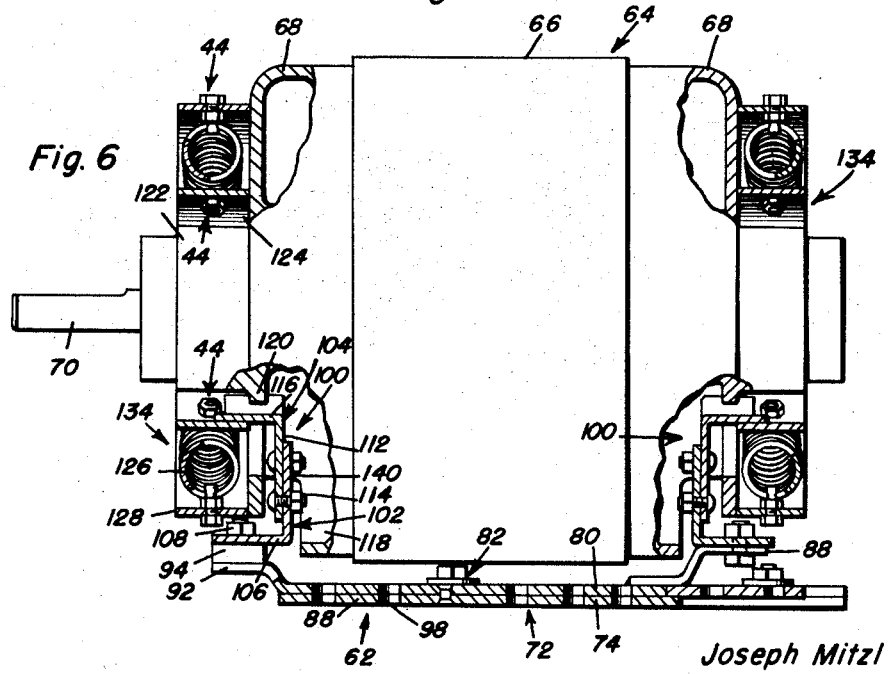

Figure 4 is an enlarged transverse vertical sectional view taken substantially upon the plane indicated by the section line 4—4 of Figure 2 and shows the shaft of the electric motor in Figure 1 in section and the supporting ring assembly in plan as viewed from the motor end thereof, portions of the mounting rings of the supporting ring assembly being broken away in order to clearly illustrate the position of coil springs of the supporting ring assembly;

Figure 5 is an enlarged exploded perspective view of a fastener which is utilized to connect the coil springs to their associated mounting rings; and Figure 6 is a perspective view of the base portion of the motor support of Figure 1 and shows the general details thereof with the supporting ring assemblies removed.

Referring now to Figures 1–4 and 6 in particular, it will be seen that there is illustrated a preferred form of motor support which is referred to in general by the reference numeral 136. The motor support 136 has mounted therein a conventional electric motor which is referred to in general by the reference numeral 138. The electric motor 138 includes a housing having a center section 140 and bells 142 at opposite ends thereof and having reduced outer end portions 144. The electric motor 138 also includes a double-ended armature shaft 146. Inasmuch as the electric motor 138 is conventional, and inasmuch as the other portions thereof in no way involve the present invention, they will not be set forth.

The motor support 136 includes a base which is referred to in general by the reference numeral 20 and which is best illustrated in Figure 6. The base 20 includes a flat plate 22 which is provided with a plurality of apertures 24 for receiving securing fasteners (not shown) for attaching the base 20 to a suitable supporting surface. The plate 22 has integral ends 26 which are bent upwardly and are disposed in spaced parallel relation.

Carried by the base 20 and overlying the plate 22 is an arcuate cross sectional cradle 28. The cradle 28 is provided with outwarly projecting, transversely extending fingers 30. The fingers 30 rest upon coil springs 32 which are vertically disposed and which have their lower ends suitably seated on the plate 22. As is best illustrated in Figures 1 and 2, the cradle 28 is of a size and configuration to snugly fit the underside of the housing of the electric motor 138 in supporting relation. It is to be understood that when the electric motor 138 is in proper position, the coil springs 32 are slightly compressed.

Referring once again to Figures 1-4 in particular, it will be seen that carried by each of the ends 26 of the base 20 is a supporting ring assembly which is referred to in general by the reference numeral 148. Inasmuch as the two supporting ring assemblies 148 are identical, only one will be set forth in detail.

Each of the supporting ring assemblies 148 includes an inverted J-shaped mounting bracket which is referred to in general by the reference numeral 150. The J-shaped mounting bracket 150 includes a vertical flange 152 which is secured to its respective end 26 in face to face engagement with the outer surface thereof by suitable fasteners 154. The J-shaped bracket 150 also includes an inwardly directed horizontal flange 156 and a downwardly directed vertical flange 158. Secured to the rear surface of the vertical flange 158 by suitable fastners 160 is a ring 162. The ring 162 is disposed in a plane normal to the armature shaft 146 and disposed concentric with respect thereto.

Carried by the ring 162 is a set of fasteners 44. The fasteners 44 are disposed in circumferentially spaced relation and extend about a major portion of the ring 162. However, the fasteners 44 do not pass through the flange 158. Disposed immediately adjacent the ring 162 and in generally spaced parallel relation with respect thereto is a coil spring 164. The coil spring 164 is shaped to form a major portion of a loop, but the bottom part thereof has been omitted in order to provide proper clearance for the J-shaped bracket 150. The coil spring 164 is retained in spaced relation with respect to the ring 162 and connected thereto by the first set of fasteners 44.

The supporting ring assembly 148 also includes a ring which is referred to in general by the reference numeral 166. The ring 166 includes an outer ring half which is referred to in general by the reference numeral 168 and the inner ring half which is referred to in general by the reference numeral 170. The outer ring half 168 includes an outermost ring portion 172 which is disposed concentric with respect to the coil spring 164 and in surrounding relation thereto. The outer ring half 168 also includes a ring portion 174 which is integrally connected to the ring portion 172 and which is disposed in spaced parallel relation with respect to the ring 162.

The inner ring half 170 includes a vertically disposed ring portion 176 which is secured to the inner surface to the rings portion 174 in face to face engagement. Formed integral with the ring portion 176 is a ring portion 178 which is concentric with the ring portion 172 and spring 164 and disposed within the spring 164. It will be noted that the ring 162 and the ring 166 combine to form a box-shaped cross sectional annular member.

Carried by the outer ring portion 172 is a set of fasteners 44. The fasteners 44 extend radially from the axis of the armature shaft 146 and are in circumferentially spaced relation. The fasteners 44 carried by the ring portion 172 connect the coil spring 164 to the ring portion 172 so that the ring 166 may be resiliently mounted with respect to the ring 162.

Carried by the ring portion 178 and projecting radially toward the axis of the armature shaft 146 therefrom is a set of fasteners 44. The set of fasteners 44 carried by the ring portion 178 will be referred to as an inner set of fasteners 44 and are disposed in a vertical plane disposed inwardly of the vertical plane in which the fasteners 44 carried by the ring portion 172 lie.

Disposed within the general confines of the ring portion 178 is a coil spring 180. The coil spring 180 is connected to the ring portion 178 by the inner set of fasteners 44 and is disposed within spaced relation with respect to the ring portion 178.

Carried by the ring portion 178 is an outer set of fasteners 44 of which the individual fasteners are also circumferentially spaced. The fasteners of the outer set of fasteners 44 carried by the ring portion 178 are disposed in a vertical plane disposed outwardly of the vertical plane in which the fasteners 44 carried by the ring portion 172 are disposed.

Disposed within the general confines of the ring portion 178 and in spaced parallel relation with respect to the coil spring 180 is a coil spring 182. The coil spring 182 is connected to the inner ring portion 178 in spaced relation with respect thereto by the outer set of fasteners 44.

The supporting ring assembly 148 also includes the ring which is referred to in general by the reference numeral 184. The ring 184 includes a concentric ring portion 186 which is disposed concentric with the ring portions 172 and 178, and a vertical ring portion 188. Carried by the concentric ring portion 186 in vertical alignment with the inner set of fasteners 44 is another set of fasteners 44. The fasteners 44 carried by the concentric ring portion 186 connects the coil spring 180 to the concentric ring portion 186.

As is best illustrated in Figure 1, the vertical ring portion 188 is formed primarily by a plurality of radiating fingers 190. Carried by each of the fingers 190 is a fastener 44. The fasteners 44 carried by the fingers 190 are arranged in concentric relation with respect to the armature shaft 146 and connect the coil spring 182 to the fingers 190. Thus, it will be seen that the ring 184 is resiliently mounted with respect to the ring 166.

Rigidly secured to the concentric portion 186 of the ring 184 is a hub 192. Mounted within the center of the hub 192 is a sleeve type bearing 194 through which the armature shaft 146 passes for rotation. It will thus be seen that the electric motor 138 is supported by its armature shaft 146. However, if it is so desired, the reduced projecting portions 144 of the end bells 142 may be connected to the hub 192 so that the weight of the electric motor 138 may be removed from the armature shaft 146.

Referring now to Figure 5 in particular, it will be seen that each of the fasteners 44 includes an elongated member 46 which is externally threaded as at 48. The member 46 is provided with an elongated slot 50 therein. Removably carried by the elongated member 46 and engaged with the threaded portion 48 thereof are a pair of nuts 52. The nuts 52 engage opposite surfaces of the ring portions to which they are attached and the inner end of the slot 50 receives a portion of the spring to which the fasteners are attached. In order to not materially affect the resiliency of the coil springs, the springs are freely mounted in relation to the fasteners 44, that is, they may move in the slots 50.

From the foregoing, it will be seen that there has been illustrated a motor support which employs a plurality of coil springs which are so disposed whereby the greatest resilient mounting may be obtained therefrom and at the same time the mounting of the coil springs is extremely simple so that the motor supports may be considered economically feasible.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

What is described as new is as follows:

1. A resilient mounting for motors and the like comprising a first ring securable to a support, a second ring disposed adjacent said first ring, a first coil spring disposed adjacent to and in spaced relation relative to said first and second rings, first fasteners carried by said first coil spring at spaced intervals directly connecting said first coil spring to said first and second rings, a third ring disposed adjacent said second ring having mounting means for attachment to a motor and the like, a second coil spring disposed adjacent to and in spaced relation relative to said second and third rings, second fasteners carried by said second coil spring directly connecting said second coil spring to said second and third rings, said fasteners each engaging the intermediate part only of said coil springs.

2. A resilient mounting for motors and the like comprising a first ring securable to a support, a second ring disposed adjacent said first ring, a first coil spring disposed adjacent to and in spaced relation relative to said first and second rings, first fasteners carried by said first coil spring at spaced intervals directly connecting said first coil spring to said first and second rings, a third ring disposed adjacent said second ring having mounting means for attachment to a motor and the like, a second coil spring disposed adjacent to and in spaced relation relative to said second and third rings, second fasteners carried by said second coil spring directly connecting said second coil spring to said second and third rings, all of said rings and coil springs being arcuate in elevation and centered about a common axis.

3. A resilient mounting for motors and the like comprising a first ring securable to a support, a second ring disposed adjacent said first ring, a first coil spring disposed adjacent to and in spaced relation relative to said first and second rings, first fasteners carried by said first coil spring at spaced intervals connecting said first coil spring to said first and second rings, a third ring disposed adjacent said second ring, said third ring having mounting means for attachment to a motor and the like, said third ring being angular in cross section and including a first flange concentric to said second ring and a second flange normal to said first flange and projecting radially towards said second ring, second and third coil springs disposed adjacent to and spaced relative to said second and third rings, second fasteners carried by said second coil spring connecting said second coil spring to said first flange and said second ring, and third fasteners carried by said third coil spring connecting said third coil spring to said second flange and said second ring.

4. The resilient mounting of claim 3 wherein said second and third coil springs are in side by side spaced parallel relation.

5. A resilient motor support comprising a first ring adapted to be secured to a support, a second ring disposed adjacent said first ring, a first coil spring disposed adjacent to and in spaced relation to said first and second rings, first fasteners directly connected to the spring at spaced intervals, certain of said fasteners being connected to the first ring and other of said first fasteners being connected to the second ring, a third ring disposed adjacent said second ring, means on said third ring adapted to mount the third ring on a motor, a second coil spring disposed adjacent to and in spaced relation to the said second and third rings, second fasteners directly connected to the spring at spaced intervals, certain of said second fasteners being connected to the second ring and other of said second fasteners connected to the third ring, said fasteners being connected to the rings in circumferentially spaced relation and being connected to the springs at spaced intervals along the length thereof and at spaced circumferential intervals about the longitudinal axis thereof.

6. The combination of claim 5, wherein each of said fasteners includes a slot freely receiving the spring to which it is connected, and a threaded shank extending through the ring to which it is connected, said shank receiving a pair of nuts engaging opposite surfaces of the ring for locking the fasteners to the ring.

References Cited in the file of this patent

UNITED STATES PATENTS

| | | |
|---|---|---|
| 519,807 | Cloud | May 15, 1894 |
| 914,659 | Harrod | Mar. 9, 1909 |
| 938,662 | Graham | Nov. 2, 1909 |
| 1,246,177 | Stava | Nov. 13, 1917 |
| 1,370,198 | Dillingham | Mar. 1, 1921 |
| 1,442,656 | Duchateau | Jan. 16, 1923 |
| 1,790,159 | Leland et al. | Jan. 27, 1931 |
| 1,832,368 | Ell | Nov. 17, 1931 |
| 1,845,551 | Mitzl | Feb. 16, 1932 |
| 2,012,687 | Leland | Aug. 27, 1935 |
| 2,135,785 | Ballman | Nov. 8, 1938 |
| 2,301,818 | Sackett | Nov. 10, 1942 |
| 2,356,940 | Marison | Aug. 29, 1944 |
| 2,588,012 | Kirkpatrick | Mar. 4, 1952 |
| 2,723,114 | Dentler | Nov. 8, 1955 |